(12) United States Patent
Watte et al.

(10) Patent No.: US 7,805,045 B2
(45) Date of Patent: Sep. 28, 2010

(54) OPTICAL FIBRE CLEAVING DEVICE

(75) Inventors: Jan Watte, Grimbergen (BE); Yvette Jogien Plaisier, Antwerp (BE); Jan Vandenbroeck, Aarschot (BE)

(73) Assignee: Tyco Electronics Raychem NV, Kessel-Lo (BE)

( * ) Notice: Subject to any disclaimer, the term of this patent is extended or adjusted under 35 U.S.C. 154(b) by 0 days.

(21) Appl. No.: 11/883,248

(22) PCT Filed: Jan. 10, 2006

(86) PCT No.: PCT/GB2006/000090

§ 371 (c)(1), (2), (4) Date: Jul. 27, 2007

(87) PCT Pub. No.: WO2006/082355

PCT Pub. Date: Aug. 10, 2006

(65) Prior Publication Data

US 2008/0310812 A1 Dec. 18, 2008

(30) Foreign Application Priority Data

Feb. 2, 2005 (GB) .................................. 0502091.2

(51) Int. Cl.
G02B 6/00 (2006.01)
(52) U.S. Cl. ....................... 385/136; 385/134; 385/135; 385/137
(58) Field of Classification Search .......... 385/134–137
See application file for complete search history.

(56) References Cited

U.S. PATENT DOCUMENTS

| | | | | |
|---|---|---|---|---|
| 4,315,584 A | | 2/1982 | Wuestner et al. | |
| 4,372,048 A | * | 2/1983 | Basile et al. | 30/124 |
| 4,474,319 A | | 10/1984 | Walker et al. | |
| 5,108,021 A | | 4/1992 | Vines et al. | |
| 5,125,549 A | * | 6/1992 | Blackman et al. | 225/96.5 |
| 5,501,385 A | * | 3/1996 | Halpin | 225/96 |
| 5,838,850 A | * | 11/1998 | Mansfield et al. | 385/31 |
| 6,578,747 B2 | | 6/2003 | Murgatroyd | |
| 6,688,207 B2 | * | 2/2004 | Tabeling | 83/679 |
| 7,305,169 B2 | * | 12/2007 | Honma | 385/136 |
| 2002/0070256 A1 | | 6/2002 | Kazama et al. | |

FOREIGN PATENT DOCUMENTS

| | | |
|---|---|---|
| EP | 0110616 B1 | 8/1986 |
| GB | 2 308 361 A | 6/1997 |
| JP | 2001 296430 A | 10/2001 |
| NZ | 207072 | 9/1987 |

OTHER PUBLICATIONS

Communication issued by EPO on May 26, 2008 for corresponding EP Patent Application No. 06 700 422.6-2216.

* cited by examiner

*Primary Examiner*—Brian M. Healy
*Assistant Examiner*—Guy G Anderson
(74) *Attorney, Agent, or Firm*—Baker & Daniels LLP (57) ABSTRACT

A mechanism for cleaving optical fibers, comprising fiber cleaving means and gripping members arranged to grip an optical fiber and to apply a pulling force to put the fiber under tension whilst the fiber is cleaved, wherein the gripping member(s) C are arranged to eject a cleaved-off part of the fiber F into a receptacle 49 once the fiber has been cleaved, and/or the fiber F is bent during cleaving by means of a rotatable double anvil 47 widely separated from the gripping members.

15 Claims, 15 Drawing Sheets

OPTICAL FIBRE CLEAVING DEVICE

The present invention relates to a device for splicing optical fibres, and in particular such a device in the form of a hand-held portable tool. The invention also relates to a mechanism for cleaving optical fibres, especially for producing end facets of fibres suitable for splicing by means of the splicing device.

There are two known basic ways of splicing together optical fibres: mechanical splicing, and fusion splicing. Mechanical splicing has the advantage that it does not require the use of powered tools, and therefore it is suitable for use in situ in an optical communications network, e.g. in an outside environment or at a customer's premises, depending upon the location in the network where the splicing is required. While highly reliable mechanical splices can be made, mechanical splices often do not provide the low degree of optical loss, or the long-term reliability, of fusion splices. Consequently, for many situations fusion splices are preferred over mechanical splices.

Fusion splicing, in which the ends of optical fibres are fused together (e.g. by means of an electric discharge applied to the ends of the fibres) requires electrical power. Battery powered portable hand-held fusion splicing tools are known and used for producing fusion splices in situ. However, although the problem of portability is partially solved by such portable splicing tools, another problem associated with the in situ formation of fusion splices remains; this is the problem of preparing the end faces of the optical fibres so that a satisfactory fusion splice between the end faces can be formed. In order to form a satisfactory fusion splice, it is necessary to produce high quality clean end faces of the optical fibres; this requires cleaving the fibres to remove their existing end portions and to produce fresh, high quality end faces. Portable fibre cleaving tools are known; however, in order to produce fibre end faces of sufficiently high quality for high quality fusion splices to be formed, a stable working platform for the portable cleaving tool is generally required. A consequence of this is that once an optical fibre is cleaved, the cleaver must be put to one side and the cleaved fibre must be transferred to the splicing tool.

The present invention seeks to solve the above problem, and to enable the formation of genuinely high quality fusion splices in situ in a reliable and convenient manner.

Accordingly, a first aspect of the invention provides a mechanism for cleaving optical fibres, comprising fibre cleaving means, and one or more gripping members arranged to grip an optical fibre and to apply a pulling force to put the fibre under tension whilst the fibre is cleaved, the gripping member(s) also being arranged to eject a cleaved-off part of the fibre once the fibre has been cleaved.

Preferred embodiments of the invention have the advantage that by combining a fibre splicing mechanism and a fibre cleaving mechanism in a single device, the problem of transferring the cleaved fibres from a cleaving device to a separate splicing device (with the associated risks of contamination and damage) is avoided.

In preferred embodiments of the invention, the fibre splicing mechanism of the device is a fusion splicing mechanism for forming fusion splices between the optical fibres. Advantageously, therefore, the splicing mechanism may include electrodes arranged to provide an electric discharge to create the fusion splice between the optical fibres.

Preferably, the fibre cleaving mechanism of the device is arranged to cleave an optical fibre to produce an end of the fibre that is suitable for splicing to another optical fibre end by means of the fibre splicing mechanism. More preferably, the cleaving mechanism is arranged to cleave an optical fibre to produce an end face of the fibre that is substantially perpendicular to a longitudinal axis of the fibre.

Advantageously, the fibre cleaving mechanism may comprise fibre cleaving means, especially a fibre cleaving member, e.g. a blade, especially a scoring blade arranged to score an optical fibre, causing a crack to propagate through the fibre, thereby cleaving the fibre. The scoring blade preferably comprises a scoring wheel. The scoring wheel may, for example, have a diamond blade, or instead another form of scoring blade formed from diamond (for example) may be used. Additionally or alternatively, the fibre cleaving mechanism may comprise an anvil that causes an optical fibre to be bent while the fibre is cleaved (e.g. while the fibre is scored by a scoring blade). The cleaving mechanism may include one or more fibre gripping and/or supporting members, to grip and/or support an optical fibre while it is cleaved.

Preferably, the cleaved-off part of the fibre is ejected by means of the gripping member(s) continuing to apply the pulling force to the cleaved-off part of the fibre after the fibre has been cleaved. The, or each, gripping member preferably releases its grip on the cleaved-off part of the fibre after the fibre has been cleaved.

The, or each, gripping member preferably is arranged to pivot about an axis oriented substantially perpendicular to the longitudinal axis of an optical fibre gripped by the gripping member. The pulling force applied to an optical fibre by the, or each, gripping member, may, for example, be applied by applying a pivoting torque to the gripping member.

Advantageously, the gripping members may comprise a pair of opposed gripping members arranged to grip an optical fibre by pinching the fibre between them.

Preferably, the gripping members are biased to adopt an open position in which an optical fibre to be gripped by the gripping members may be placed between the gripping members, until the cleaving mechanism is actuated whereupon the gripping members grip the fibre.

The cleaving mechanism or splicing device of the invention may include a waste receptacle arranged to receive ejected cleaved-off parts of optical fibres from the gripping members.

In particularly preferred embodiments of the invention, the device further comprises one or more separate clamping blocks for clamping onto optical fibres to be cleaved and spliced by the device. Advantageously, the device may include one or more holding means arranged to hold a clamping block clamped to an optical fibre, during the cleaving and/or splicing of the fibre. The holding means may be arranged to cause or allow movement of a clamping block between the cleaving mechanism and the splicing mechanism, for example. Additionally or alternatively, the holding means may be arranged to position with respect to each other the ends of optical fibres clamped by the clamping blocks, so that the ends of the fibres may be spliced together by the splicing mechanism.

In some embodiments of the invention, the device may include an optical monitoring system whereby the alignment and/or proximity of the ends of the optical fibres clamped by the clamping blocks is/are monitored, e.g. by means of light transmitted through at least one of the optical fibres. Such monitoring systems are well known to persons skilled in the art. The device may include a control system whereby the alignment and/or proximity of the ends of the optical fibres clamped by the clamping blocks is/are controlled by the holding means using alignment and/or proximity information obtained by the monitoring system, for example. Advantageously, the device, especially the holding means, may include a piezoelectric mechanism (or other mechanism) for positioning the ends of the optical fibres clamped by the clamping blocks.

Preferably the device or mechanism is a portable tool, especially a hand-held tool.

Preferably the cleaving mechanism and/or the splicing mechanism is/are electrically powered, most preferably battery powered.

Some preferred embodiments of the invention will now be described, by way of example, with reference to the accompanying drawings, of which:

FIG. 1 (views (a) and (b)) shows a first embodiment of a hand-held portable splicing device according to the invention;

FIG. 2 (a) shows another (partial) view of the first embodiment of the splicing device;

FIG. 2 (b) shows a detail of FIG. 2 (a);

FIG. 3 (a) shows a further (partial) view of the first embodiment of the splicing device;

FIG. 3 (b) shows a detail of FIG. 3 (a);

FIG. 4 (views (a) and (b)) shows a second embodiment of a hand-held portable splicing device according to the invention;

FIG. 5 (a) shows another (partial) view of the second embodiment of the splicing device;

FIG. 5 (b) shows a detail of FIG. 5 (a);

FIG. 6 (views (a) and (b)) show further (partial) views of the second embodiment of the splicing device;

FIG. 9 (views (a) and (b)) shows further views of the cleaving mechanism of FIGS. 7 and 8;

Figure 1A:
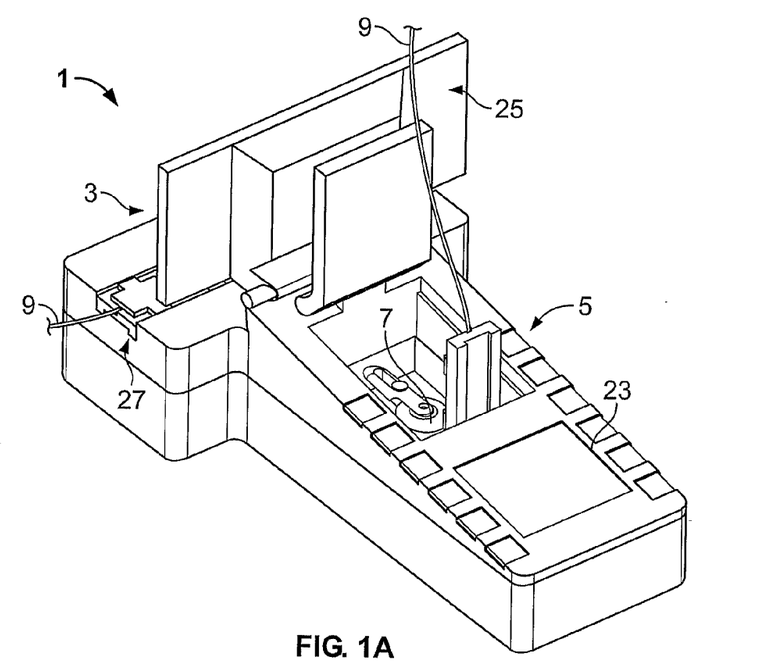
Figure 1B:
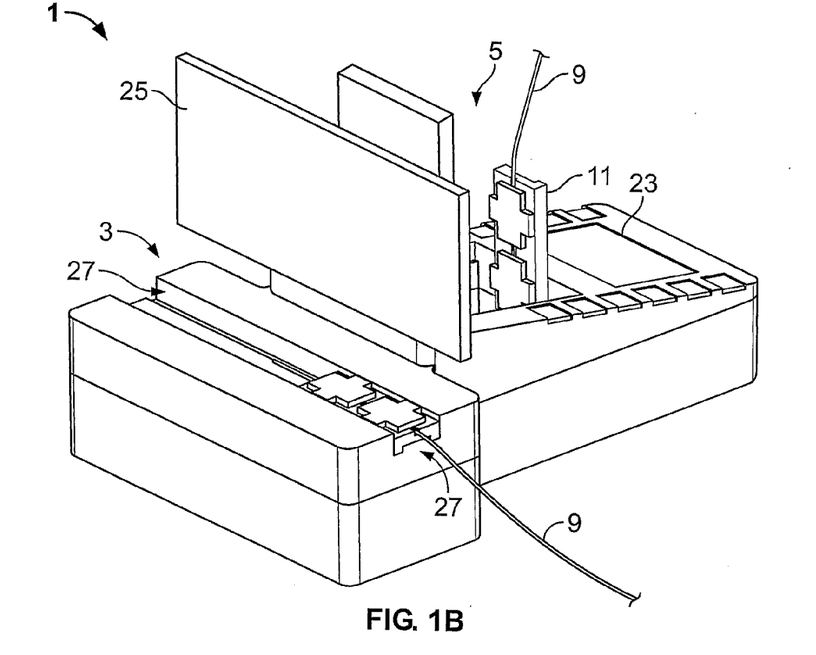

FIG. 1 (views (a) and (b)) shows a first embodiment of a hand-held portable splicing device 1 according to the invention. The splicing device comprises a fibre splicing mechanism 3 and a fibre cleaving mechanism 5.

Figure 2A:
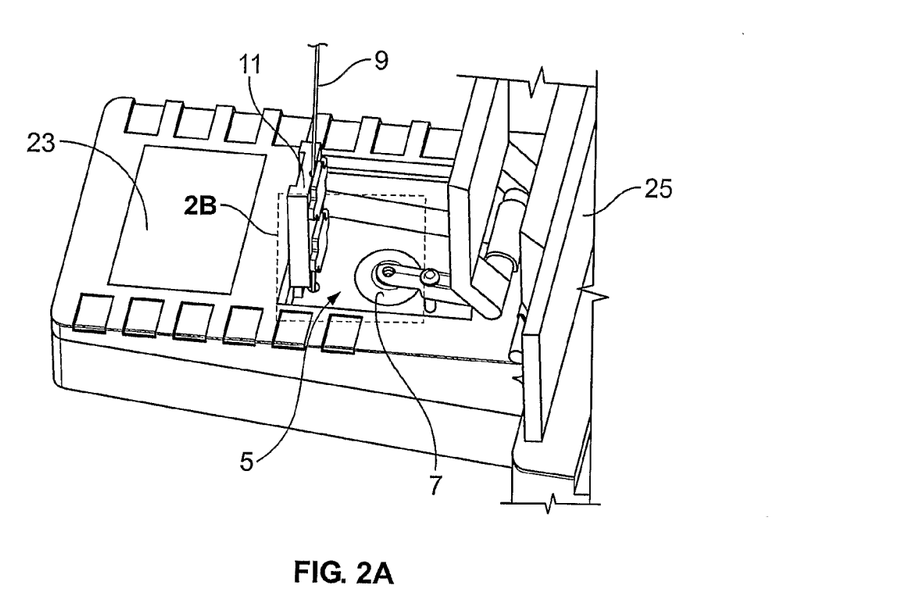
Figure 2B:
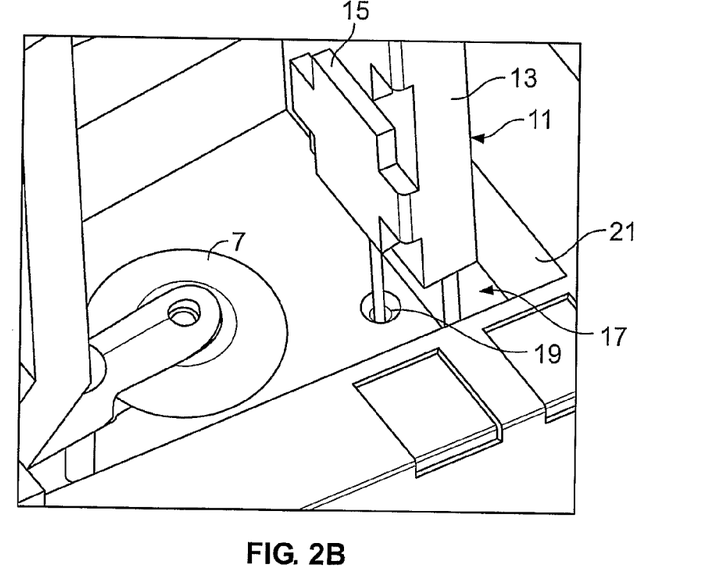
Figure 3A:
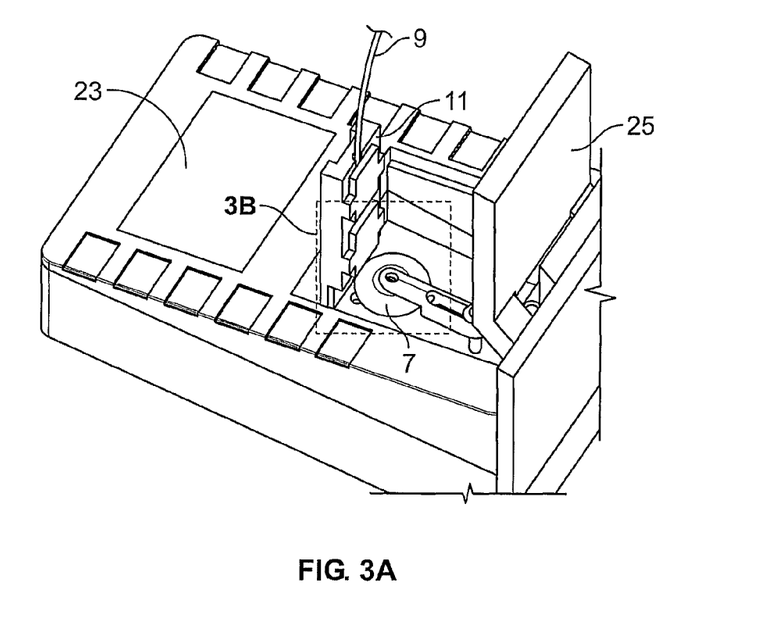
Figure 3B:
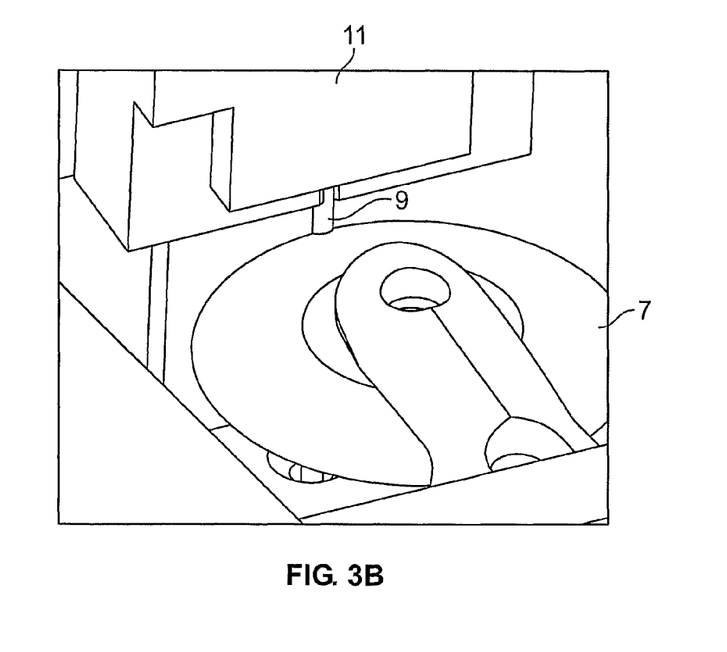

The fibre cleaving mechanism 5 is illustrated most clearly in FIGS. 2 and 3; it comprises a scoring blade in the form of a scoring wheel 7 which is movable substantially in the plane of the wheel such that it may approach and score an optical fibre 9 held by the device. As illustrated, the optical fibre 9 has a clamping block 11 clamped onto it. The clamping block 11 comprises a main part 13, and two secondary parts 15 that are attachable (e.g. by means of magnetic attraction, but other attachment mechanisms are possible) to the main part 13, to clamp the optical fibre 9 between the main part and each secondary part. The clamping block 11 (with the optical fibre 9 clamped thereto) is inserted into a holding means in the form of a receiving slot 17 in the splicing device 1 such that an end portion of the optical fibre 9 is received and clamped in an aperture 19 in the device. When the clamping block 11 and the optical fibre 9 are so arranged (as shown in FIGS. 2 and 3) a portion 21 of the optical fibre 9 extending between the clamping block 11 and the aperture 19 is oriented substantially perpendicular to the scoring wheel 7. Then, as shown in FIG. 3, the fibre cleaving mechanism is actuated (preferably electronically by means of a keypad 23), causing the scoring wheel to approach the optical fibre 9, and to score the fibre. The cleaving of the optical fibre 9 is completed by means of an anvil (not shown) of the cleaving mechanism, which deflects the portion 21 of the fibre, causing a crack to propagate through the fibre from the scored surface of the fibre. The cleave produces a new end face of the optical fibre 9, which is substantially perpendicular to the longitudinal axis of the fibre.

Returning now to FIG. 1 (views (a) and (b)), the splicing mechanism 3 of the device 1 is partitioned from the cleaving mechanism 5 by a pivoting screen 25. Once an optical fibre 9 has been cleaved, thereby producing a new perpendicular end face of the fibre, the clamping block/fibre assembly is manually removed from the cleaving mechanism 5, and installed in the splicing mechanism 3. (The clamping block 11 remains clamped onto the optical fibre 9 for the subsequent splicing operation.) The splicing mechanism 3 includes a holding means in the form of a precision stage 27 (generally in the form of a groove, as illustrated). Once a second optical fibre has been cleaved in an identical manner to that described above, its clamping block/fibre assembly (i.e. the fibre with the clamping block still clamped thereto) is manually removed from the cleaving mechanism 5, and also installed in the precision stage 27 of the splicing mechanism 3, oriented such that the new end faces of the two optical fibres are facing each other. (That is, the second optical fibre is oriented in exactly the opposite orientation, i.e. at 180 degrees, with respect to the first optical fibre.)

Next, the two optical fibres 9 to be spliced are aligned and brought to the correct face-to-face proximity for fusion splicing, by means of the precision stage 27. The fibres are moved with respect to each other via their respective clamping blocks 11, which themselves are moved on the precision stage 27 by a piezoelectric mechanism, or by another mechanism (e.g. by electric motors). The correct alignment and proximity positioning of the two fibres preferably is monitored, and may be automatically controlled, by an optical monitoring/control system. This monitoring/control system utilizes light transmitted along and/or across at least one of the optical fibres, and monitors and/or controls the correct positioning of the fibres based upon light detected from the end faces of the fibres and/or across the fibres.

Once the end faces of the two optical fibres 9 are correctly positioned with respect to each other for fusion splicing, the splicing is carried out by means of electrodes (not shown) of the splicing mechanism 3, which create an electric discharge that fuses the ends faces of the fibres together by means of highly localized elevated temperatures. During the fusing process, the two fibre end faces may be pushed against each other to ensure a correct, defect-free fusion. Also, the pivoting screen 25 is oriented flat, so that it substantially covers the splicing mechanism and the optical fibres, to protect the operator from the electric discharge. Once the fusion splice has been created, and the optical fibres have cooled, the secondary parts 15 are removed from the clamping blocks 11, thereby allowing the fused fibres to be removed from the device 1.

Figure 4A:
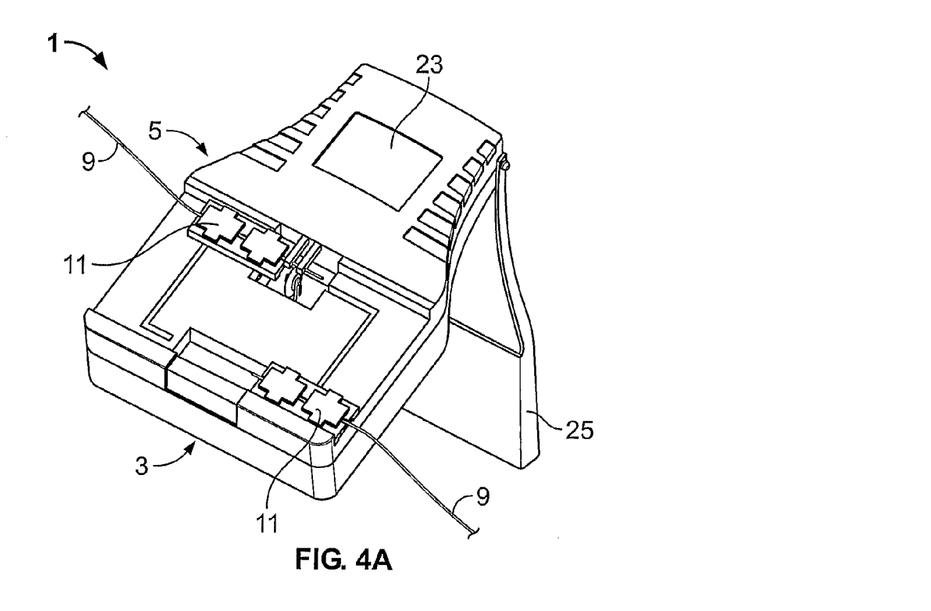
Figure 4B:
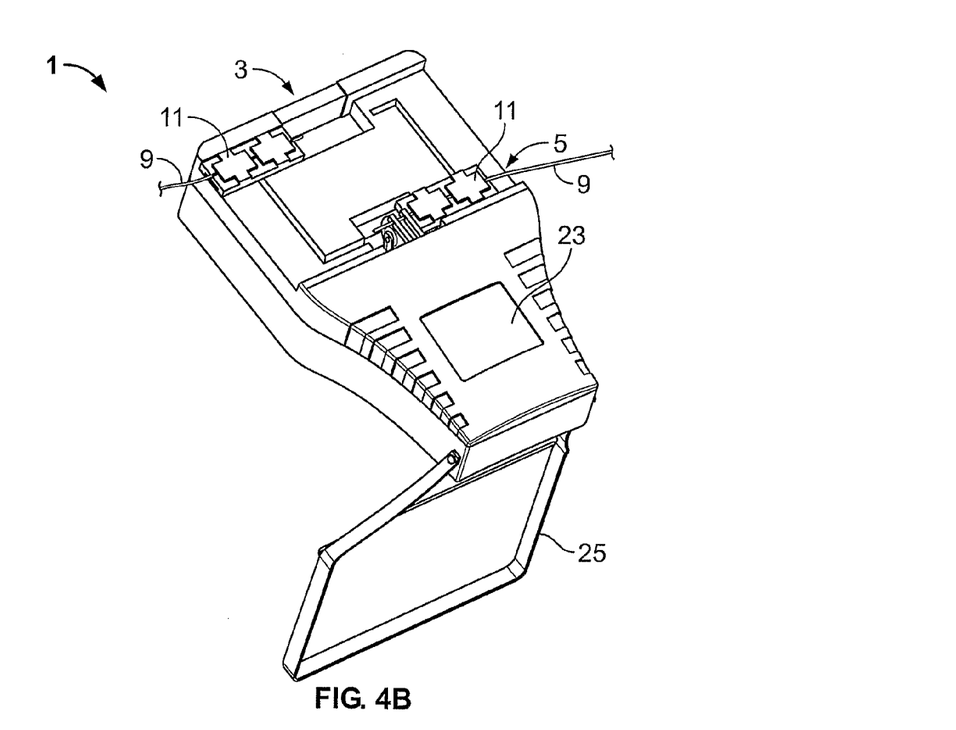
Figure 5A:
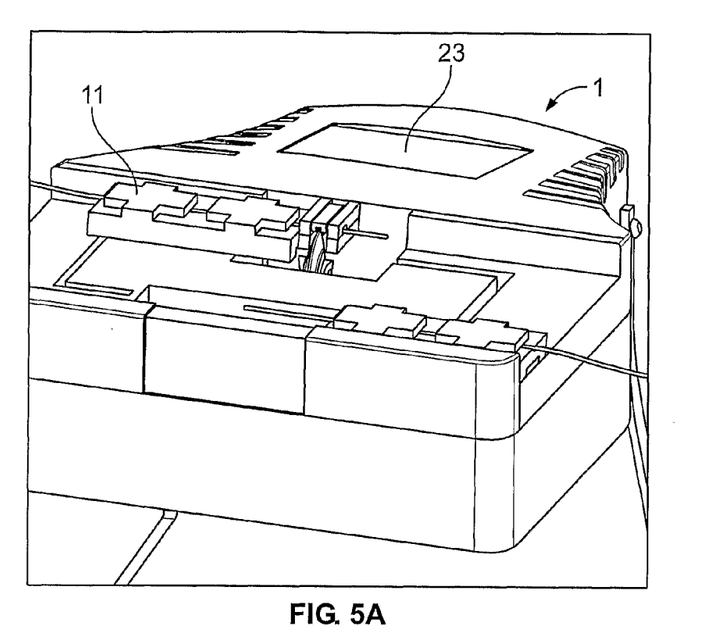
Figure 5B:
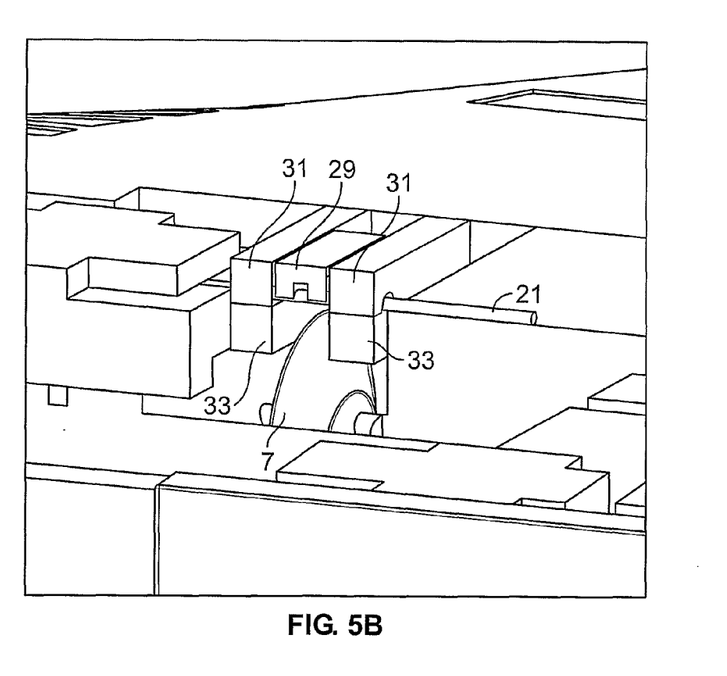
Figure 6A:
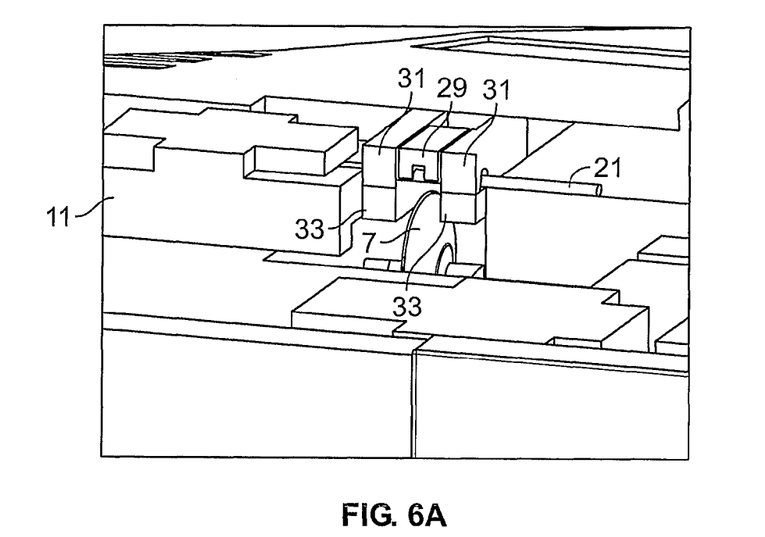
Figure 6B:
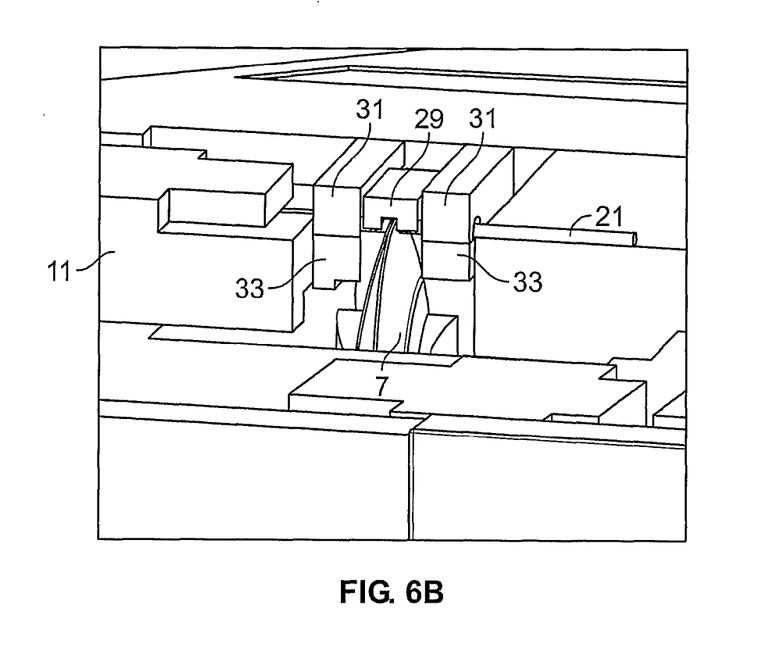

FIGS. 4 to 6 illustrate a second preferred embodiment of a splicing device according to the invention. The device 1 comprises a fibre splicing mechanism 3, a fibre cleaving mechanism 5, an electronic control panel 23, and a pivoting screen 25. This embodiment of the invention is similar to that illustrated in FIGS. 1 to 3, except that in this embodiment the fibre splicing mechanism 3 and the fibre cleaving mechanism 5 are arranged substantially parallel to each other such that the clamping blocks 11 holding the fibres being cleaved and spliced are substantially parallel to each other.

The cleaving mechanism 5 of the second embodiment of the invention is shown in detail in FIGS. 5 and 6. The cleaving mechanism comprises two pairs of fibre gripping members, each pair being located on a respective side of a fibre scoring blade 7 in the form of a scoring wheel, and a central anvil 29. Each pair of fibre gripping members comprises a fixed gripping member 31 and a movable gripping member 33 that preferably is movable electronically by means of the electronic control panel 23. In use, the movable gripping members 33 are moved away from their respective fixed gripping members 31, to provide a gap between the members to allow the insertion of an optical fibre between them. As shown in FIG. 5, an optical fibre 9 clamped in a clamping block 11 is located in the cleaving mechanism such that a portion 21 of the optical fibre extending from an end of the clamping block is located between the fixed gripping member 31 and the movable gripping member 33 of each pair of gripping members. Then, as shown in FIG. 6 (a), each movable gripping member 33 is moved towards its respective fixed gripping member, thereby clamping the optical fibre between the members. As shown in FIG. 6 (b), the scoring blade 7 is then moved against the optical fibre to produce a score in the fibre. The central anvil 29 is then moved against the optical fibre between the two pairs of gripping members, and presses against the optical fibre so as to deflect it slightly in the region between the two pairs of gripping members. As shown in FIG. 6, the anvil 29 includes a central groove oriented substantially perpendicular to the optical fibre, the groove being adjacent to the fibre. The optical fibre is cleaved by the anvil 29 deflecting the fibre on both sides of the fibre opposite to the score (i.e. on both sides of the groove in the anvil), between the two pairs of gripping members. Such deflection causes a crack to propagate through the fibre from the score, producing a new end facet of the fibre that is substantially perpendicular to its longitudinal axis. As an alternative to the scoring blade moving against the fibre and the fibre subsequently being deflected by the anvil 29, the scoring blade 7 may be substantially fixed, and instead the scoring and crack propagation may be achieved by pressing the anvil against the fibre, thereby pressing the fibre against the scoring blade.

FIGS. 7 to 10 show various aspects of a preferred optical fibre cleaving mechanism according to the invention. The illustrated cleaving mechanism may be a component of a splicing device according to the first aspect of the invention, or it may be a cleaving mechanism according to the second aspect of the invention.

Figure 7:
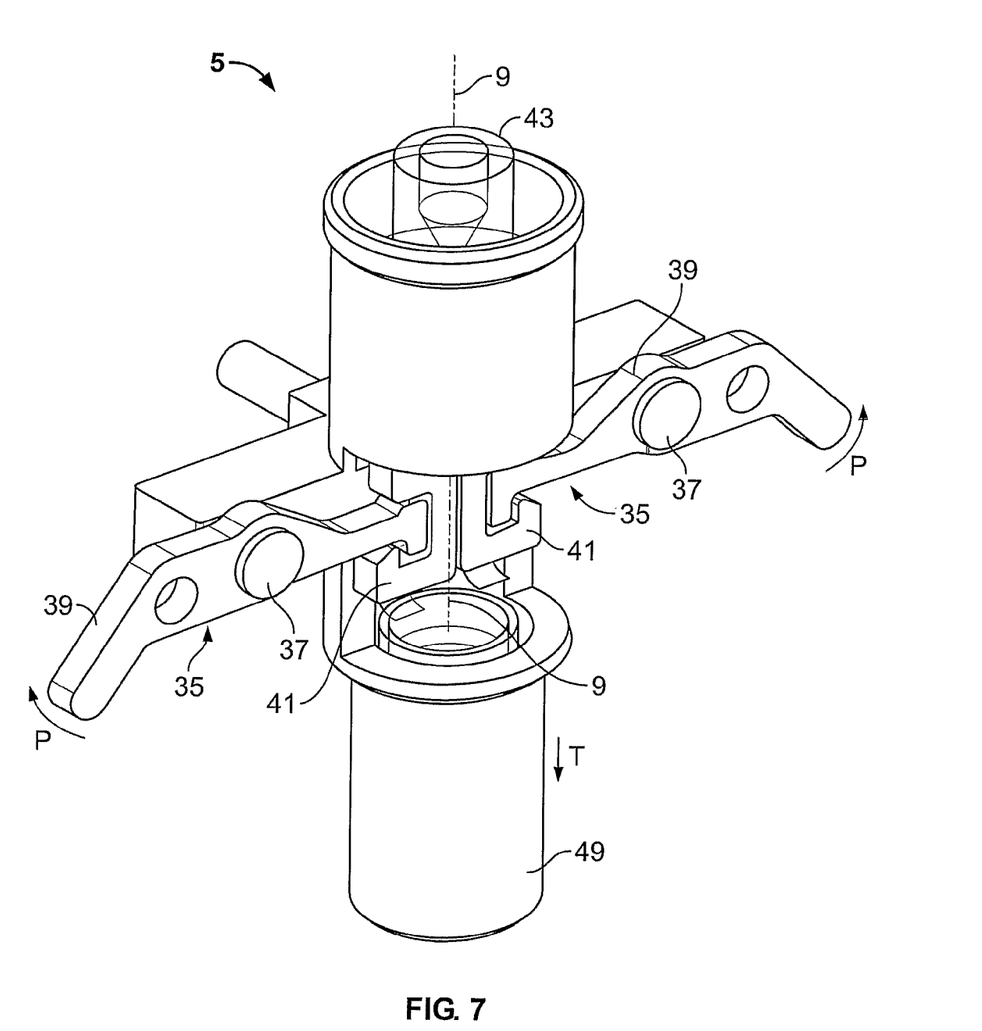
FIG. 7 is a partially sectional illustration of part of a preferred cleaving mechanism according to the invention.

The optical fibre cleaving mechanism 5 comprises a scoring blade 45 (see FIG. 9), and a pair of opposed gripping members 35. The gripping members 35 are arranged to pivot about respective pivot points 37, and their pivot axes are oriented substantially perpendicular to the longitudinal axis of an optical fibre 9 gripped by the gripping members. The gripping members 35 in fact each comprise a pivoting arm 39 and a separate gripping part 41 that engages with an end of the pivoting arm nearest to the optical fibre 9. When the cleaving mechanism is not in use, the pivoting arms 39 of the gripping members 35 are biased by means of respective springs 43 (see FIG. 8) in directions opposite to those indicated by the arrows P in FIG. 7, such that a gap is provided between the two opposed gripping parts 41. An optical fibre to be cleaved is inserted into an insertion cylinder 43 until an end region of the fibre extends between the opposed gripping parts 41, as shown in FIG. 7. When the cleaving mechanism is actuated (preferably electronically) the pivoting arms 39 are rotated in the directions indicated by the arrows P (for pivot) in FIG. 7, by an applied pivoting torque. This rotation of the pivoting arms 39 causes the gripping parts 41 to be pushed together, due to the interlocking of each pivoting arm 39 with its respective gripping part. Consequently, the gripping members 35 grip the optical fibre 9 and also apply a pulling force in the direction indicated by the arrow T (for tension) in FIG. 7, which puts the fibre under tension. The optical fibre 9 is then cleaved by means of a scoring blade 45 in cooperation with a deflecting anvil 47, while the fibre is maintained under the tension applied by the gripping members 35. The cleaved-off part of the optical fibre 9 is then ejected into a waste receptacle 49 by the gripping members 35.

Figure 8:
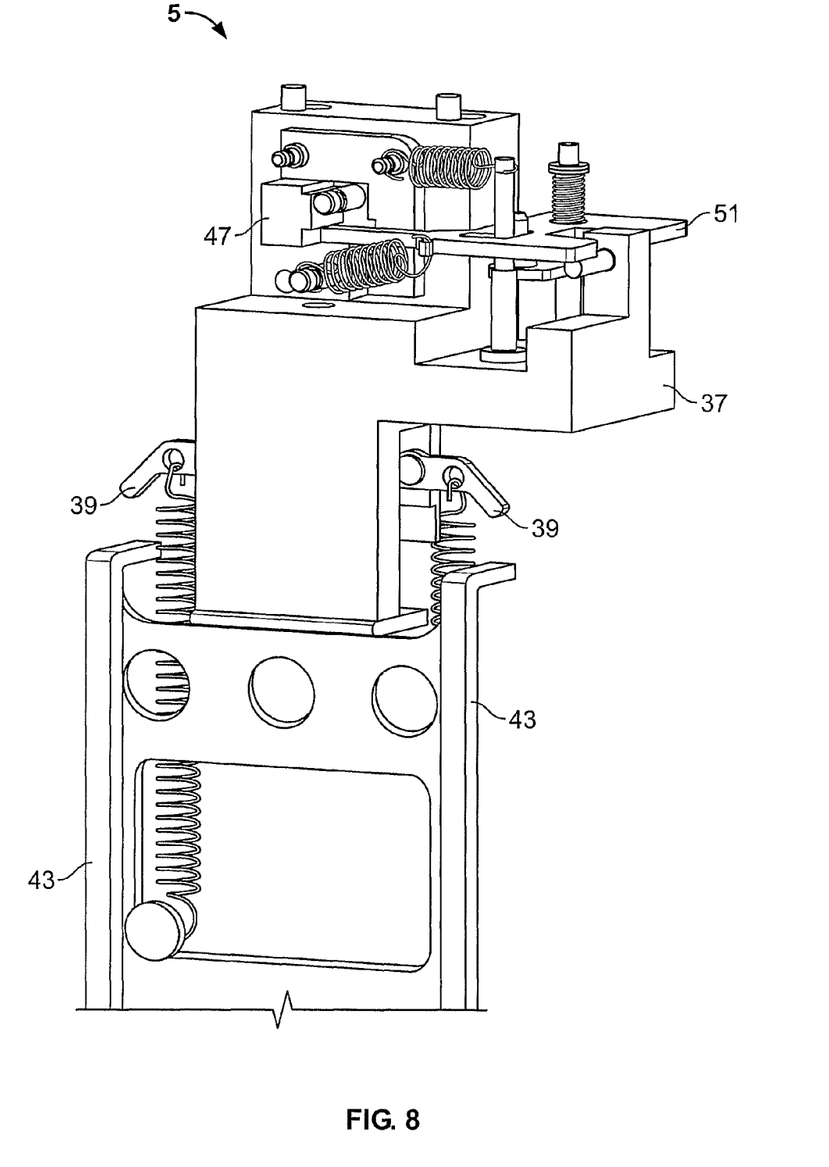
FIG. 8 shows another view of the cleaving mechanism of FIG. 7.
Figure 9A:
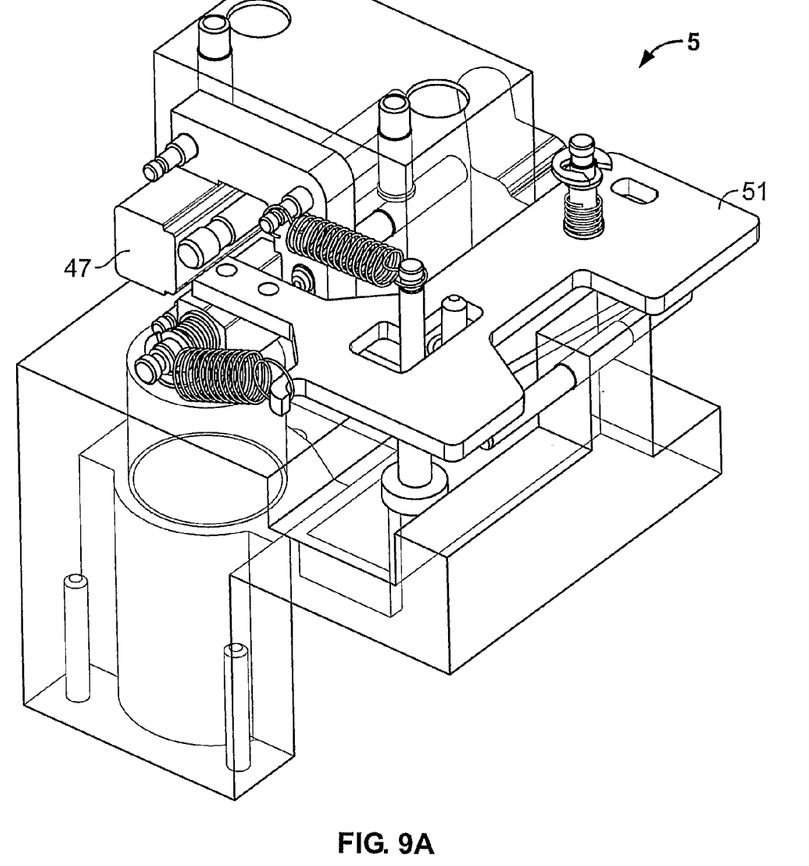
Figure 9B:
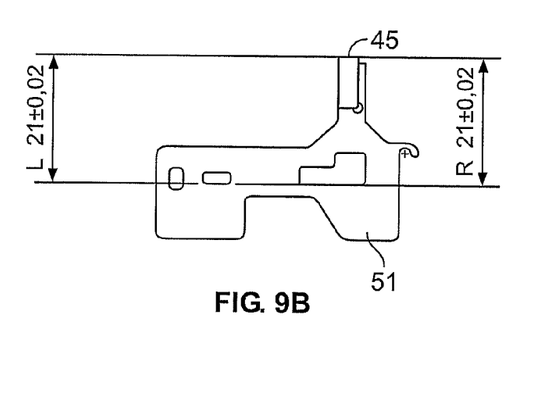
Figure 10:
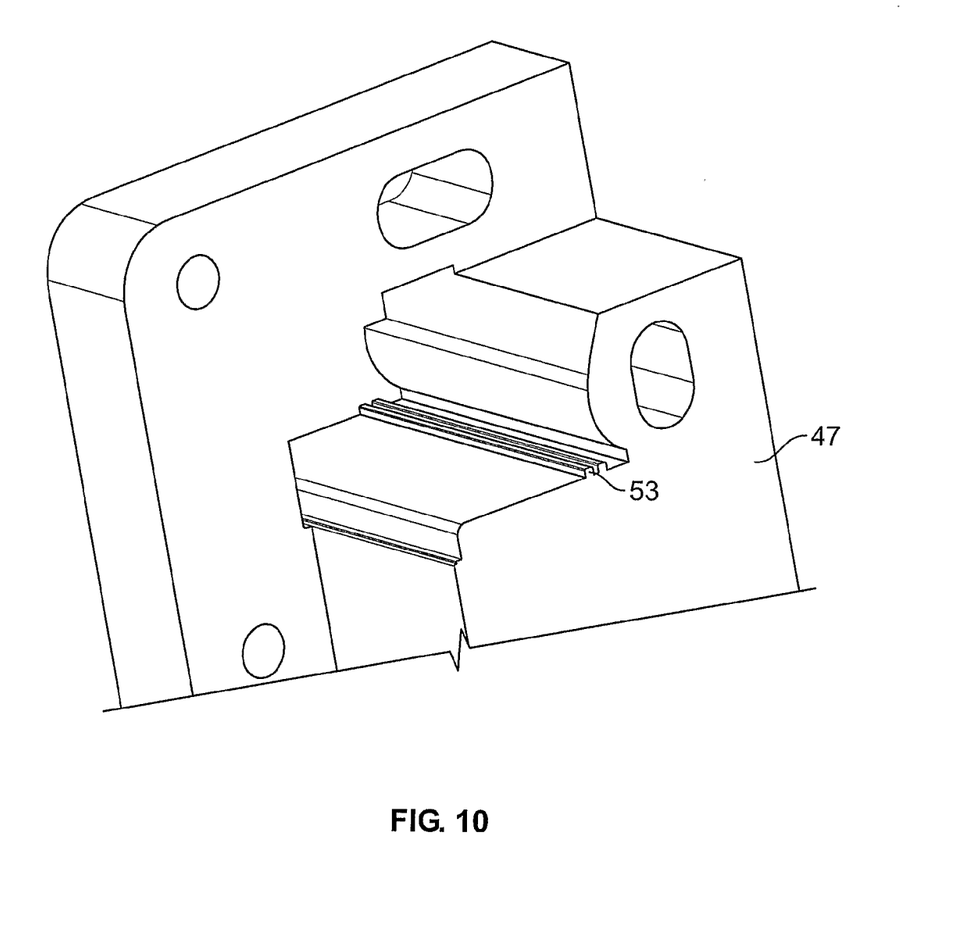
FIG. 10 shows details of some components of the cleaving mechanism of FIGS. 7 to 9.

As shown in FIGS. 8 and 9, the scoring blade 45 (which preferably is a diamond blade) is carried by a blade support 51. The anvil 47 is shown in FIGS. 8, 9 and 10, and includes a groove 53 which serves the same purpose as the groove of the anvil 29 shown in FIGS. 5 and 6.

Further aspects of the present invention may be appreciated by comparison with European Patent 0985160 and U.S. Pat. No. 6,578,747 of Oxford Fiber Ltd. ("Oxford"). It is noted that Oxford's patents are restricted to cleaving tools having anvil and blade means between a pair of spaced apart clamping means, which clamping means are described as holding or gripping and "traction tensioning" a length of optical fibre therebetween. The Oxford patents require that their cleaving blade (13) scores the fibre while it is bent between the closely-adjacent fibre-deflecting corners either of the anvil (10) and one of the stationary clamping means (5), or of the anvil (10) and a further member (26) inserted in the confined space (e.g. 1 mm) between the anvil (10) and the clamping means (5).

Contrary to the Oxford patents, Tyco's present cleaving tool design provides a different and advantageous mechanism, wherein the cleaving blade is associated with an angularly-movable (hereinafter "rotatable") fibre-deflecting member, preferably a rotatable double anvil, which can be widely separated (preferably by more than 1 cm, more preferably at least 2 cm) from each of the fibre clamping members. This Tyco cleaving tool mechanism may be more fully understood by way of example from FIGS. 11 to 15 of the accompanying illustrations, which amplify features of the structure already described in FIGS. 7 to 10.

Figure 11:
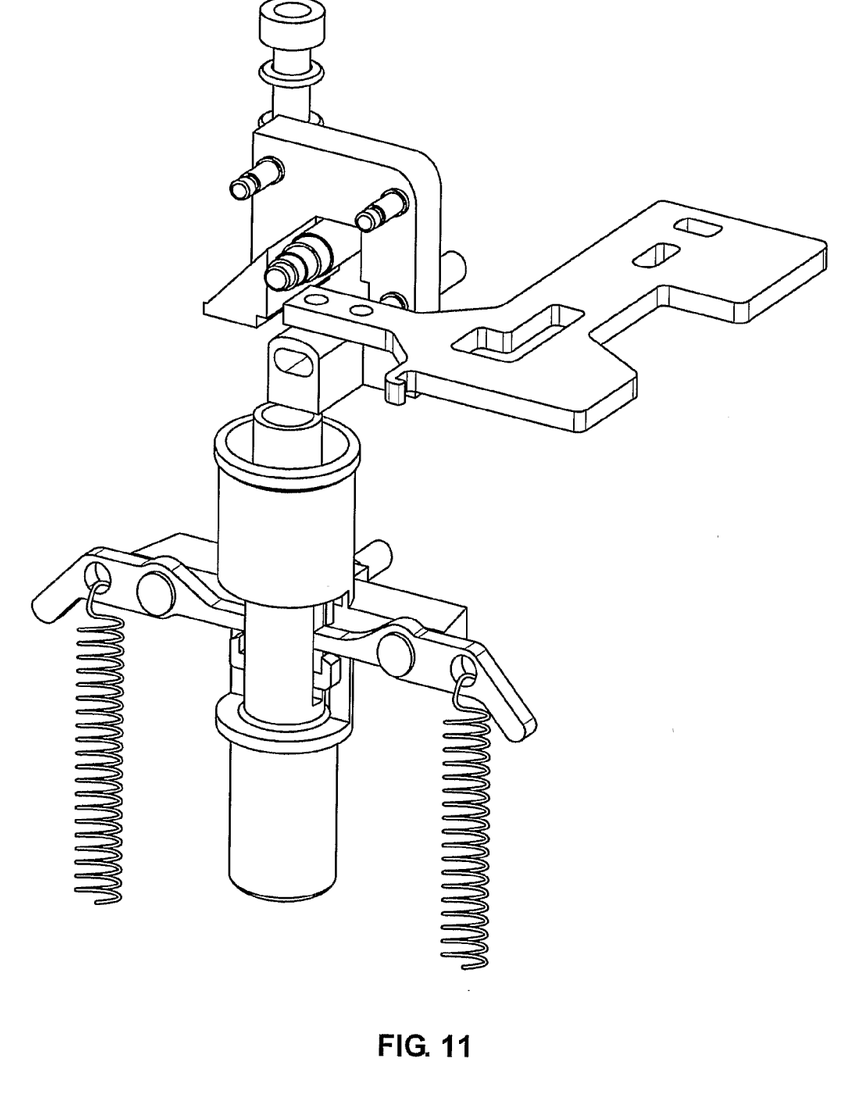
FIG. 11 shows a rotatable double anvil block.

FIG. 11 shows our deflecting anvil 47, which is a rotatable double anvil block, and its associated cleaving blade support 51. Separate lever-operated clamping means C (similar to that described in more detail with reference to FIG. 7) is arranged to apply traction tension to the fibre F at a position well below the anvil/blade assembly.

Figure 14:
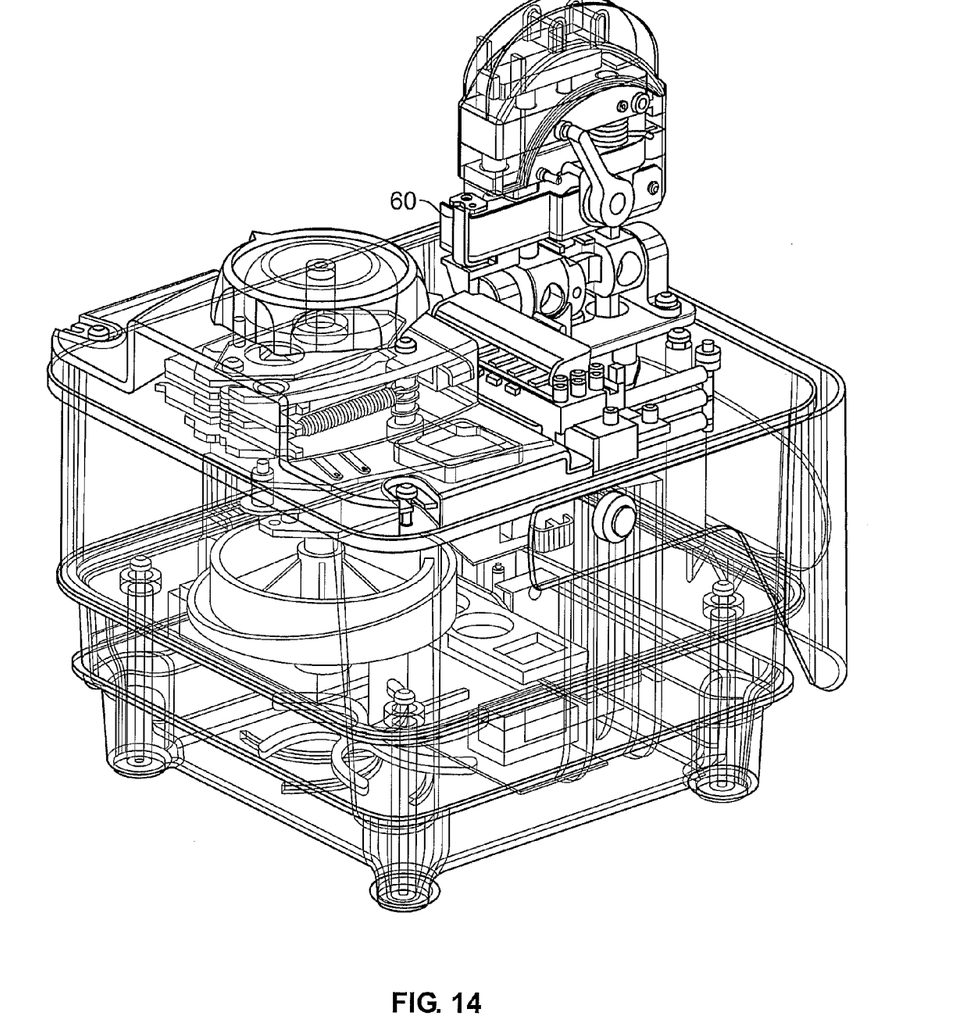
FIGS. 14 and 15 respectively show the open and closed states of another clamping member for gripping the fiber on the opposite side of the anvil.
Figure 15:
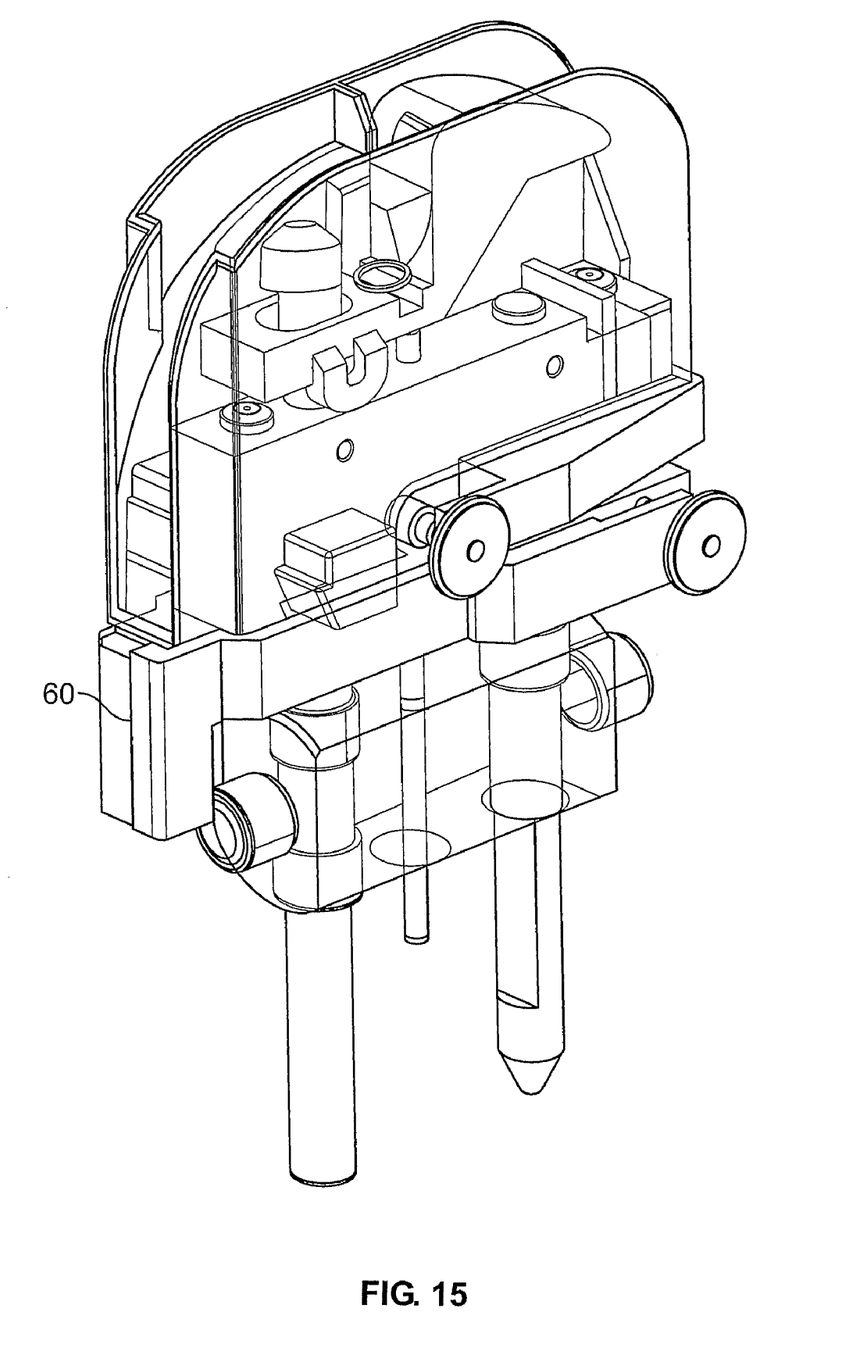

FIGS. 14 and 15 respectively show the open and closed states of the other clamping member 60 which grips the fibre F on the other side of the anvil (the side remote from the aforesaid lever-operated clamp C). The clamp 60 is spaced away from the blade and anvil assembly along the fibre to an extent similar to, or possibly greater than, the spacing of the clamp C from the anvil.

Figure 12:
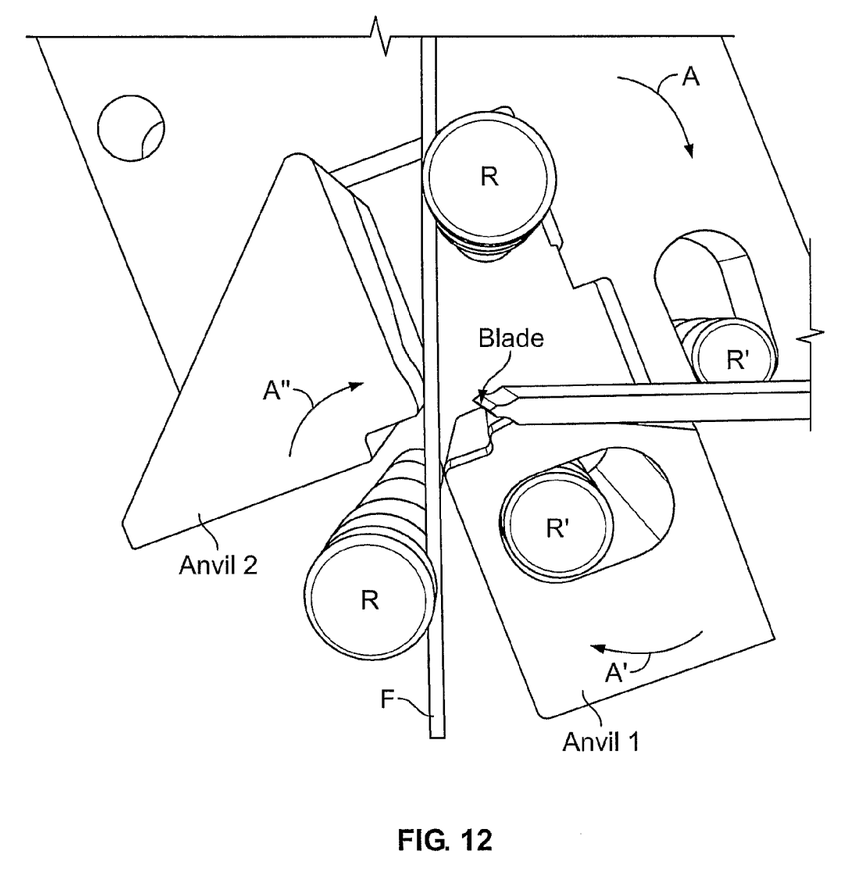
FIGS. 12 shows and 13 show the operation of the rotatable anvil assembly in more detail.
Figure 13:
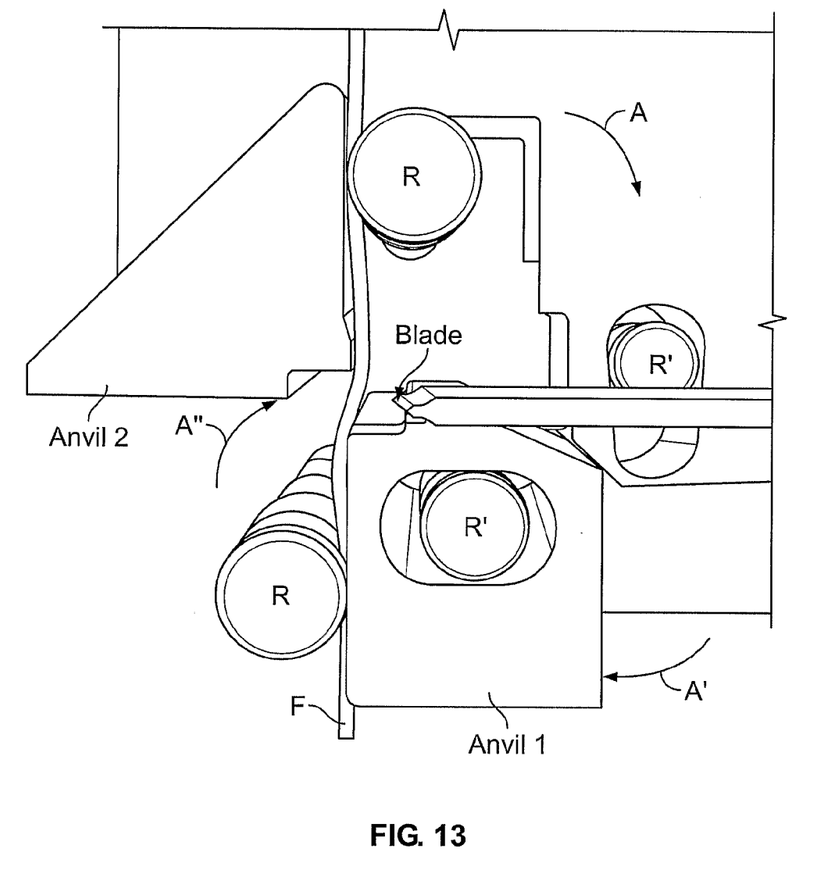

FIGS. 12 and 13 show the operation of Tyco's inventive rotatable anvil assembly in more detail. The fibre F is shown in FIG. 12 positioned in the guide grooves G of fibre-lateral-positioning rods R so that the fibre extends across the transverse anvils 1 and 2. The double anvil block is rotatable in the direction of arrow A partly controlled by the illustrated movement-control rods R' in slots formed in the anvil block, thus to move anvil 1 angularly from right to left (arrow A') and anvil 2 angularly from left to right (arrow A"). FIG. 13 shows the assembly after such angular movement has bent the fibre F around the oppositely-acting corners of anvils 1 and 2 ready for movement of the blade 62 to score and cleave the bent fibre. After cleaving, the anvil block is returned to its starting position ready to receive the next fibre to be cleaved.

As an alternative, it would be possible to arrange the rotatable double anvil block so that either one of the anvils remains more-or-less stationary relative to the fibre, while the other anvil moves angularly to effect bending of the fibre between the oppositely-acting corners of the anvils.

The guide grooves G of the rods R are preferably dimensioned to allow relatively free longitudinal movement of the fibre F within the grooves, while the necessary longitudinal traction is applied to the fibre by Tyco's aforementioned remotely-situated clamps. This separation of the Tyco clamps from the vicinity of the anvil/blade assembly has the technical advantages of simplifying the manufacture of the tool and conveniently enabling the lever-operated clamp C to provide an ejection or "shooting" action for propelling the cleaved-off end portion of each successive fibre down into a suitable receptacle 49 for safe disposal, as described in more detail with reference to FIG. 7.

Tyco's inventive rotatable fibre-deflecting structure may of course be combined with any of the other features of the optical fibre cleaving mechanism hereinbefore described.

The invention claimed is:

1. A mechanism for cleaving optical fibers, comprising a fiber cleaving mechanism, and one or more gripping members arranged to grip a clamped optical fiber at one end thereof to be cleaved off and being movable along the axis of the fiber to apply a pulling force to put the fiber under tension whilst the fiber is cleaved, the gripping member(s) also being arranged to eject a cleaved-off part of the fiber by means enabling the gripper members to continue to apply the pulling force so as to move the cleaved off part of the fiber after the fiber has been cleaved, and the or each, gripping member to subsequently release the grip on the cleaved off part of the fiber during the movement of the cleaved off part of the fiber.

2. A mechanism or a device according to claim 1, wherein the, or each, gripping member is arranged to pivot about an axis oriented substantially perpendicular to the longitudinal axis of an optical fiber gripped by the gripping member.

3. A mechanism according to claim 2, wherein the pulling force applied to an optical fiber by the, or each, gripping member, is applied by applying a pivoting torque to the gripping member.

4. A mechanism according to claim 1, wherein the gripping members comprise a pair of opposed gripping members arranged to grip an optical fiber by pinching the fiber between them.

5. A mechanism according to claim 1, wherein the gripping members are biased to adopt an open position wherein an optical fiber to be gripped by the gripping members may be placed between the gripping members, until the cleaving mechanism is actuated whereupon the gripping members grip the fiber.

6. A mechanism according to claim 1, wherein the gripping members comprise opposed levers angularly movable about a pivot axis substantially perpendicular to the longitudinal fiber axis from a first position where opposed ends of the levers are separated to provide a gap capable of receiving an optical fiber to be cleaved, to a second position where the said opposed ends are closer together (than in the first position) to grip and apply tension to an optical fiber positioned in the said gap during cleaving of the fiber, and the levers are further angularly movable in the same sense beyond the second position to a third position where the said opposed ends are further apart (than in the second position), thereby to eject a cleaved-off portion of the fiber.

7. A mechanism according to claim 6, wherein actuation of the cleaving mechanism also effects the angular movement of the levers.

8. A mechanism according to claim 1, further comprising a waste receptacle arranged to receive the ejected cleaved-off part of the optical fiber from the gripping member(s).

9. A mechanism according to claim 1, wherein the fiber cleaving means comprises a blade.

10. A mechanism according to claim 9, wherein the blade comprises a scoring blade arranged to score an optical fiber.

11. A mechanism according to claim 1, incorporated together with a fiber-splicing mechanism in a device for splicing optical fibers.

12. A mechanism for cleaving optical fibers, comprising fiber cleaving means and gripping members arranged to grip an optical fiber and to apply a pulling force to put the fiber under tension whilst the fiber is cleaved, further comprising a rotatable fiber-deflecting member having two oppositely-acting fiber-deflecting surfaces for bending the fiber whilst the fiber is cleaved.

13. Mechanism according to claim 12, wherein the rotatable fiber-deflecting member is widely separated from the fiber clamping members.

14. Mechanism according to claim 12, wherein the rotatable fiber-deflecting member is a rotatable double anvil.

15. A mechanism for cleaving optical fibers, comprising fiber cleaving means associated with a rotatable fiber-deflecting member having two oppositely-acting fiber-deflecting surfaces for bending the fiber whilst the fiber is cleaved, and one or more gripping members arranged to grip an optical fiber and to apply a pulling force along the axis of the fiber to put the fiber under tension whilst the fiber is cleaved, the gripping member(s) also being arranged to eject a cleaved-off part of the fiber once the fiber has been cleaved.

* * * * *